United States Patent [19]
Rand et al.

[11] Patent Number: 5,104,059
[45] Date of Patent: Apr. 14, 1992

[54] LONG ENDURANCE HIGH ALTITUDE BALLOON

[75] Inventors: James L. Rand, San Antonio; Loren G. Seely; Michael S. Smith, both of Sulphur Springs; Carole Y. Foster, Mt. Vernon; Phyllis J. Gray, Mt. Pleasant; Everett J. Shelby, Jr., Mt. Vernon; Thomas M. Lew, San Antonio, all of Tex.

[73] Assignee: Winzen International, Inc., San Antonio, Tex.

[21] Appl. No.: 536,202

[22] Filed: Jun. 11, 1990

[51] Int. Cl.$^5$ .............................................. B64B 1/58
[52] U.S. Cl. ...................................... 244/31; 244/126
[58] Field of Search ......................... 244/31, 126, 128

[56] References Cited

U.S. PATENT DOCUMENTS

| | | | |
|---|---|---|---|
| 2,612,328 | 9/1952 | Huch | 244/31 |
| 2,767,941 | 10/1956 | Gegner et al. | 244/31 |
| 2,886,263 | 5/1959 | Ferguson | 244/31 |
| 3,391,883 | 7/1968 | Curtis | 244/31 |
| 4,032,086 | 5/1977 | Cooke | 244/31 |
| 4,387,868 | 6/1983 | Regipa | 244/31 |
| 4,434,958 | 3/1984 | Rougeron | 244/126 |
| 4,877,205 | 10/1989 | Rand | 244/31 |

OTHER PUBLICATIONS

"Long Duration Balloon Technology Survey", Final Report, Report No. WII-9942-01-TR-01, Mar. 11, 1989, Winzen International, Inc.

*Primary Examiner*—Joseph F. Peters, Jr.
*Assistant Examiner*—Carla Mattix
*Attorney, Agent, or Firm*—Baker & Botts

[57] ABSTRACT

A high altitude, high pressure balloon comprised of a number of gores. The gores are made from a material and have a size, that are the results of an analysis of the anticipated stresses to which the balloon will be subjected. In particular, the gores are made from nylon and have dimensions that have been determined to result in stable creep characteristics. An alternate embodiment of the balloon uses multiple spheres.

19 Claims, 8 Drawing Sheets

LONG ENDURANCE HIGH ALTITUDE BALLOON

TECHNICAL FIELD OF THE INVENTION

This invention relates to high altitude balloons, and more particularly to a high altitude balloon designed to remain aloft for extended time periods.

BACKGROUND OF THE INVENTION

Although balloons have been used for useful applications for over 200 years, for over 160 of these 200 years, balloons were made from rubber and fabric, and were too heavy to escape the lower atmosphere. It is only in recent years that the development of plastic films has made high altitude balloons possible. These films, first developed in the 1940's, have permitted the manufacture of balloons that can reach the stratosphere and near space.

High altitude balloons are designed to carry a payload into altitudes as high as 120,000 feet or higher. These balloons stay aloft in the air by being filled with lighter than air lift gases. Typical uses of high altitude balloons are communications and observation platforms and geophysical and astrophysical research.

Many high altitude balloons are "low pressure" balloons and are vented so that the lift gas inside the balloon may escape. This helps preserve the integrity of the balloon material, but encourages the balloon to change volume, which causes its altitude to change. Ballast is used to help maintain a constant altitude. However, venting and ballast are effective only to the extent that low pressure balloons are useful for short duration flights in the order of several days.

High pressure balloons are another approach to maintaining constant volume. A problem with high pressure balloons, however, is that the balloon must not only withstand stresses due to the payload, but also those produced by pressurization. These stresses affect the characteristics of the material used to construct the balloon, such as by stretching or deterioration, and cause the volume of the balloon to change or cause destruction of the balloon.

One characteristic of potential balloon materials, that determines their suitability for high pressure balloons is known as "creep". Creep is a mechanical behavior of materials that continue to strain with time when subjected to a constant stress even at a constant temperature. More technically, creep is the time-dependent portion of strain. For creep-susceptible materials, increasing either stress or temperature increases creep. When creep is present, material failure may occur at stresses or temperature that are below those present during short duration uses. Certain materials, notably nylon, have been rejected in the past due to their susceptibility to creep.

Creep is only one property of potential balloon materials that affects the success of the balloon. Also, good properties in one area often detract from the properties in another area. Thus, selection of materials is an important decision in the design process. A common material used for existing high pressure balloons is polyester, such as Mylar, which has good strength and modulus characteristics. Also used are layers of different plastic films, with each layer selected for certain desired properties.

A problem with previous attempts to maintain long duration flights of high pressure balloons is failure of the balloon material. These failures are attributable to a number of factors, especially including temperature extremes and high gas pressures. Furthermore, the failure rate increases as the payload and therefore the balloon size and pressure increase. The high failure rate of high altitude, high pressure balloons, combined with the expense of trial and error balloon testing, has led to a reluctance to experiment with new materials. A need exists for a balloon that can be especially designed to withstand the pressures and temperatures of high altitude, long duration flights.

SUMMARY OF THE INVENTION

The invention comprises a high pressure balloon manufactured from multiple gores, which are made from a polyamide material such as nylon. The overall shape of the gores result in a generally spherical shaped balloon. The dimensions of the gores are determined according to a mechanical analysis that accounts for material creep by determining an appropriate gas fill pressure for a desired balloon volume. An additional feature of the invention is that the gore dimensions may be selected according to a thermal analysis.

An alternative embodiment of the invention comprises a multiple sphere, high pressure, high altitude balloon. This embodiment has the general shape of at least two intersecting spheres, and can be referred to as a "multicell" balloon. A belt constrains the spheres at their intersection.

A technical advantage of the invention is that a high altitude balloon is provided that is useful for flights of long durations. For example, using balloon designed according to the invention, a flight supporting a 50 pound payload for one year is believed to be feasible. Various methods of material and thermal analysis make it possible to predict the balloon's behavior at the anticipated stresses. Without such an analysis, the expense of constructing test balloons greatly limits experimentation with new materials.

Multiple sphere embodiments of the invention provide an improved lift to weight ratio. This shape takes advantage of the low stresses inherent in spherical shapes with a reduction in balloon diameter.

DETAILED DESCRIPTION OF THE INVENTION

Figure 1:
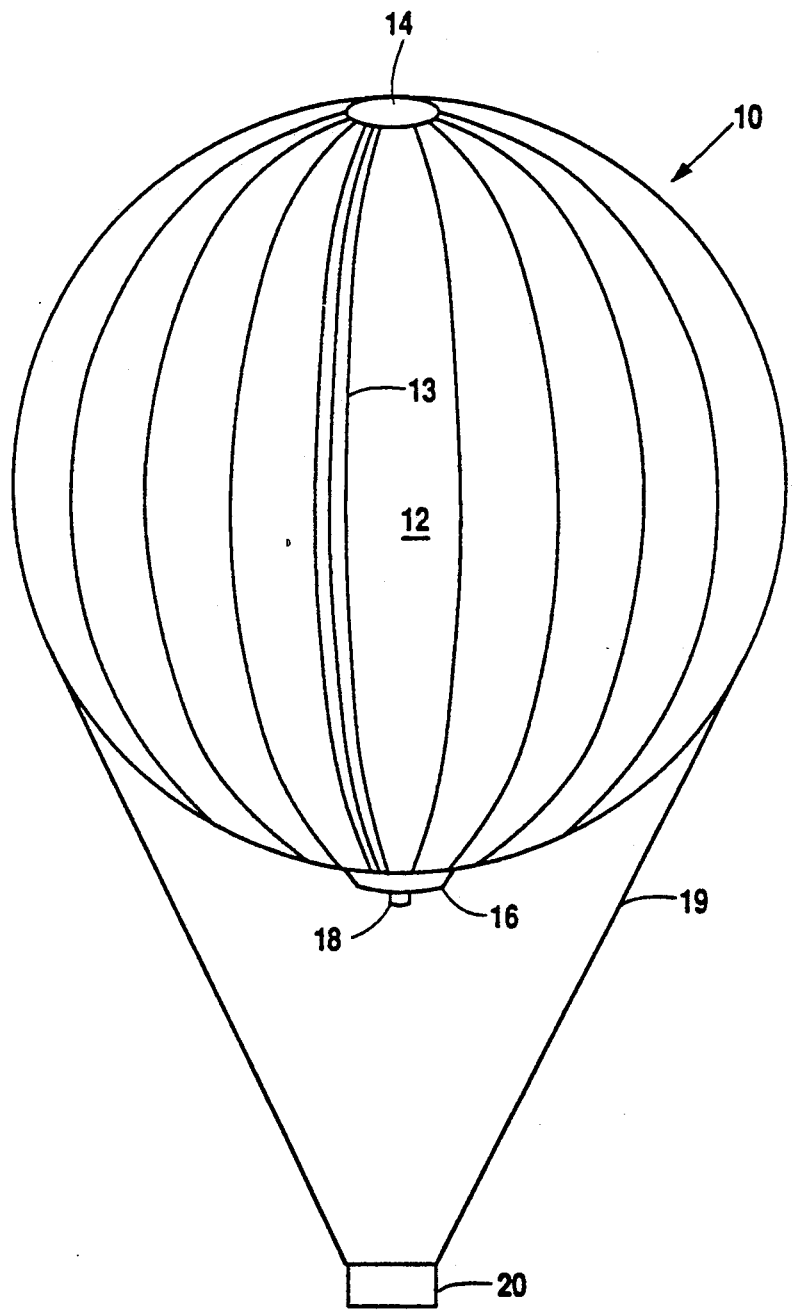
FIG. 1 is a perspective view of a balloon constructed in accordance with the invention.

FIG. 1 is a perspective view of a high altitude balloon 10, which is generally spherical in shape. However, because the spherical shape is difficult to maintain during use, the shape often departs from spherical, although it tends to maintain symmetry. Thus, balloon 10 is equivalently a "single cell" balloon 10. As explained below, an alternative embodiment of balloon 10 is comprised of multiple spheres, and is equivalently a "multi-cell" balloon 10.

In practice, the spherical shape of balloon 10 is the result of its being fabricated from a number of gores 12 cut from flat sheets of material. The shape becomes more nearly spherical with an increased number of gores 12. A typical balloon 10 has any number of gores 12, depending on its size. Balloon 10 is designed to carry aloft a payload 20 secured to balloon 10 by means of load lines 19 that are attached to the upper apex of balloon 10 and run down the sides of balloon 10. Any number of load lines 19 may be used, as is appropriate for the strength of each load line 19 and the weight of the payload 20. The load lines 19 are attached in a manner that minimizes stress at any one particular point, by techniques known in the art.

The size of balloon 10 is determined by various parameters, including the weight of payload 20 that balloon 10 will carry and the altitude at which it is to float. The parameters used in designing balloon 10 are a feature of the invention and are discussed in further detail below.

The edges of each gore 12 are sealed to the edges of adjacent gores 12 by any one of a variety of means. The construction of such balloons by cutting and sealing gores 12 is known in the art of balloon manufacture. One process for constructing a low pressure balloon, which may be used to construct balloon 10 is described in U.S. Pat. No. 4,877,205, which is incorporated by reference herein.

Balloon 10 is sealed and not vented, as in low pressure balloons. Thus, at the upper end of gores 12, where they meet at the upper apex, an end cap 14 is sealed in. Also, at the bottom apex, a flange and gasket 16 are used to seal that end, with a connection fitting 18 for filling balloon 10 with gas. This placement of flange and gasket 16 and fitting 18 is not material to the invention and their positions could be reversed.

Figure 2:
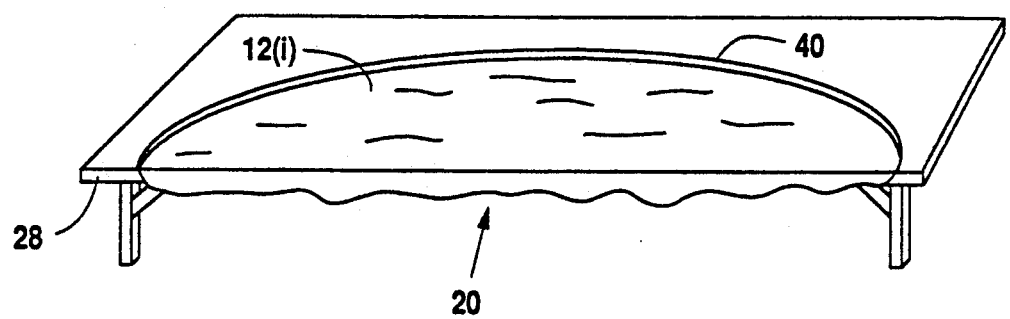
FIG. 2 is a perspective view of a folded balloon gore, placed on a cutting and sealing table during the construction process of the balloon.

FIG. 2 illustrates an additional step in the process described in U.S. Pat. No. 4,877,205. This additional step is particularly useful for construction of balloon 10, whose shape is more spherical than the shape of low pressure balloons. A problem with the wide gores 12 is that the workers' ability to reach across table 20 as they fold and shape each gore 12, is limited. To ease the manufacturing process, the gore material is longitudinally folded as it is laid on table 20. Each gore 12(i) is folded longitudinally, in half, on table 20 rather than being spread out its entire width. Index line 40 is marked on table 20 to indicate a half gore width rather than a full gore width. The fold of gore 12(i) is placed along index line 40. The edges of the folded gore 12(i) are placed along the table edge 28, as bottom and top edges. Each next seal is made to the bottom edge of the folded gore 12(i), while the top edge is folded back. After the seal is made, the seam is pulled away from table edge 28 to leave workspace for sealing the next seam.

The material used for balloon 10 is an important feature of the invention. Balloon 10 is constructed of a film of polyamide plastic, such as nylon 6, which is referred to herein as the "gore material". In the preferred embodiment, the gore material is a commercially available brand of biaxially oriented nylon 6, known as Emblem and manufactured by the Allied Signal Corporation. This material has a high modulus, high tensile strength, and good thermal properties.

The thickness of the gore material is another design parameter. For a given gore material, a greater thickness may be used to contain gases at higher pressures. Of course, increased thickness results in a heavier balloon, which must be considered when determining balloon size, i.e., volume. A typical thickness that might be used is 0.48 mil.

Because biaxially oriented nylon tends to lose its orientation if heated above its shrink temperature, these films cannot be heat-sealed directly to each other to form balloon 10. Thus, referring again to FIG. 1, a special tape 13 is used to butt-seal gores 12 to each other. To seal gores 12, an adhesive is applied to one side of tape 13. A special tape dispensing apparatus folds tape 13 longitudinally and presents the adhesive-faced tape 13 along the edge of the gores 12 to be sealed. An alternative method would use tape 13 on both sides of the seam. The preferred adhesive is a polyamide hot melt adhesive, for example, the UNI-REZ 2654 adhesive manufactured by the Union Camp Corporation.

As stated above, the volume of balloon 10 is a design parameter that is determined, for the most part, by the user's desired altitude and payload. For balloon 10, for which constant volume is desired, there are two governing parameters: the maximum and the minimum stress to which the balloon 10 will be subjected.

The stress to which balloon 10 is subjected is a function of maximum and minimum temperatures to which balloon 10 will be exposed. The supertemperature is a major factor in the superpressure of balloon 10, where "supertemperature" is the temperature difference between the lift gas and the ambient air and "superpressure" is the pressure above the atmospheric pressure at altitude. In general, the maximum and minimum supertemperatures correspond to the day and night temperatures of the gas inside balloon 10 at float altitude. At night the gas temperature may become close to the ambient temperature, but during the day the temperature increases and causes an increase in pressure.

Thus, the maximum supertemperature determines the maximum expected pressure in the balloon material, which determines the stress levels for which balloon 10 must be designed. The minimum supertemperature determines the amount of gas in the balloon needed to prevent loss of volume due to loss of pressure. An accurate analysis of these temperature extremes and their effect on the gore material is necessary to prevent over-pressurization or loss in volume.

An initial step in the design analysis is forecasting the temperatures of the balloon gas. This process includes not only a forecast of the ambient temperatures during day and night, but also optical and thermal analysis of the gore material. The latter analysis includes determining characteristics such as transmissivity, reflectivity, and emissivity, at both solar and infra red wavelengths.

Figure 3:
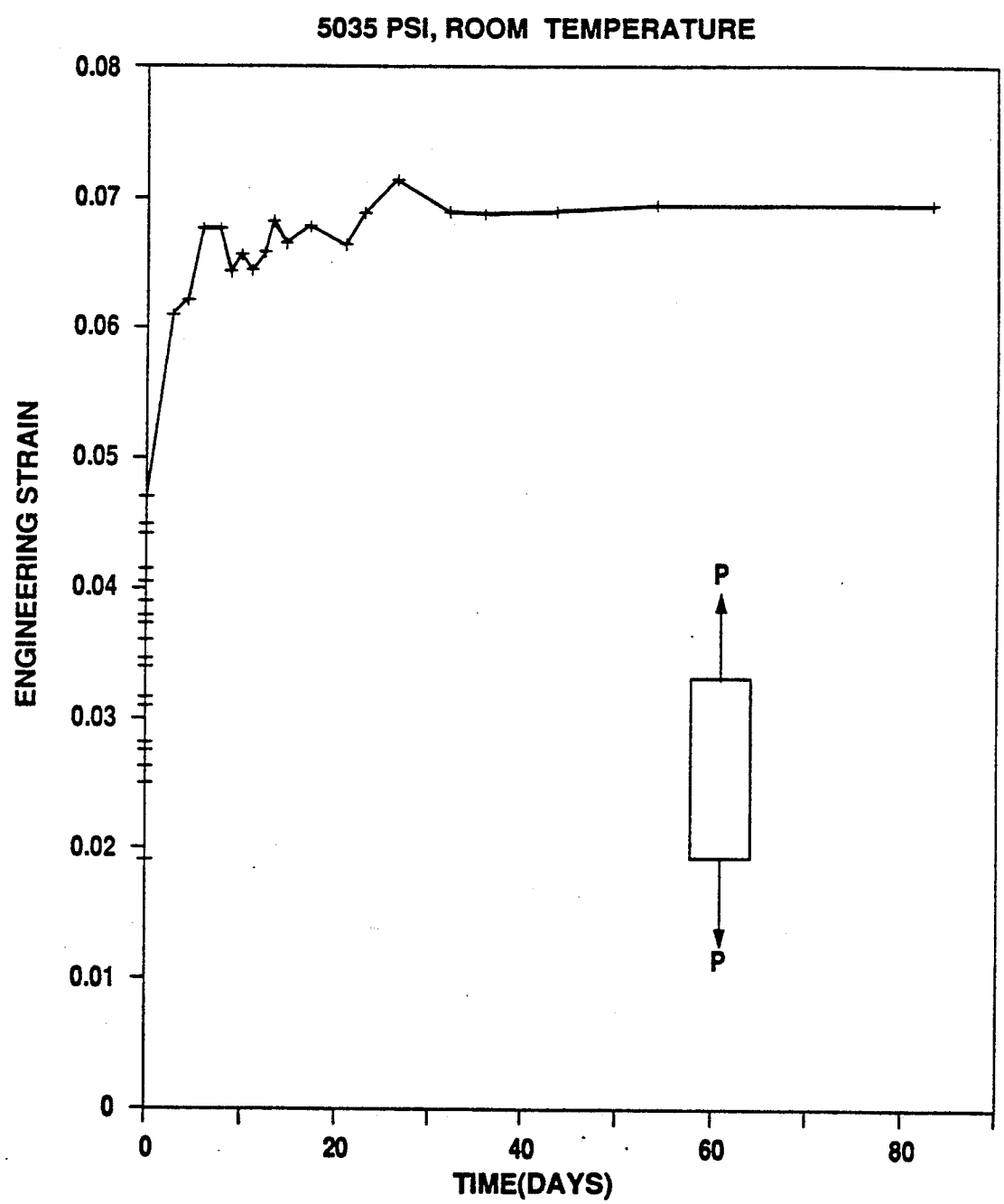
FIGS. 3-5 illustrate a creep analysis used in determining gore size.
Figure 4:
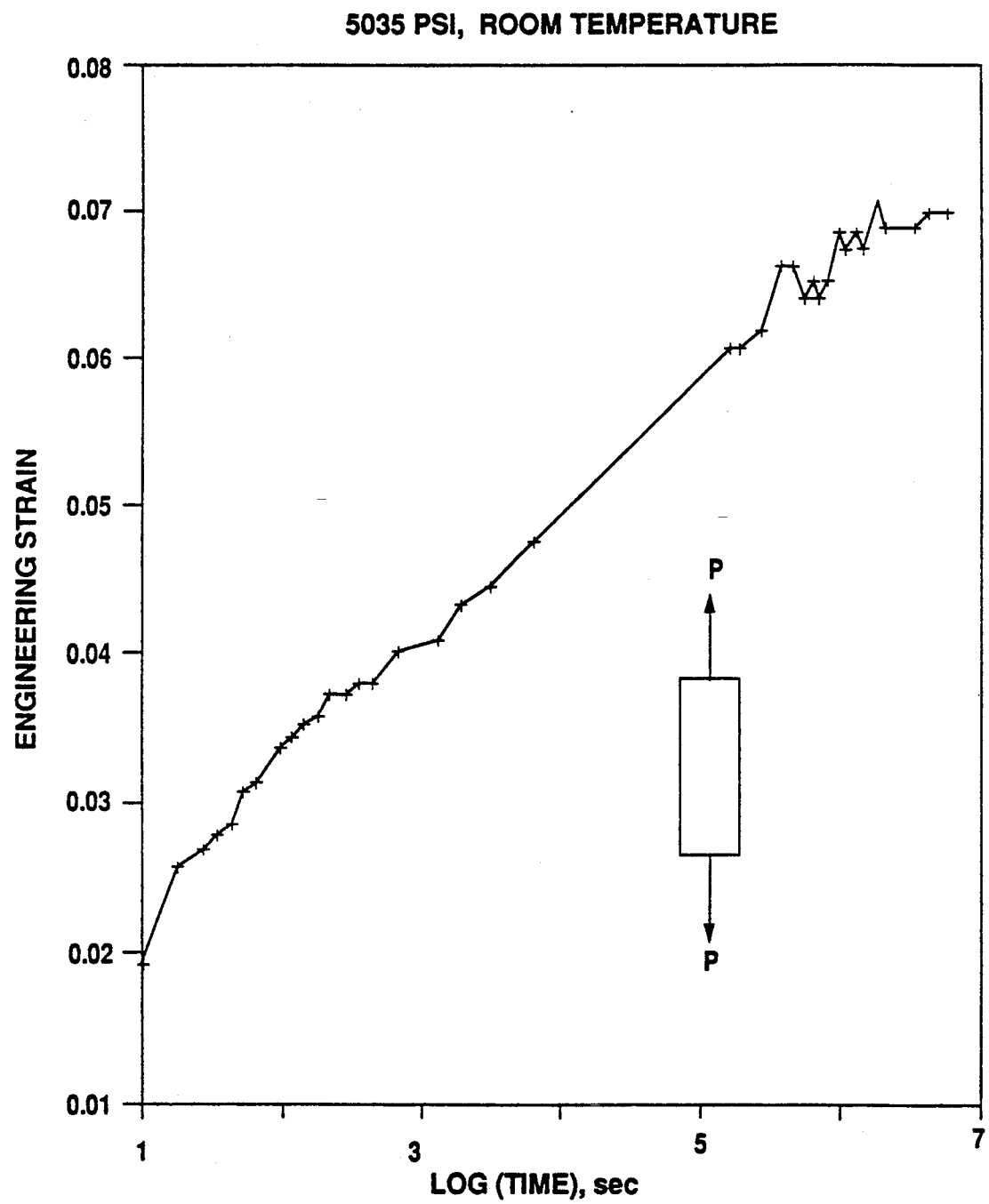
Figure 5:
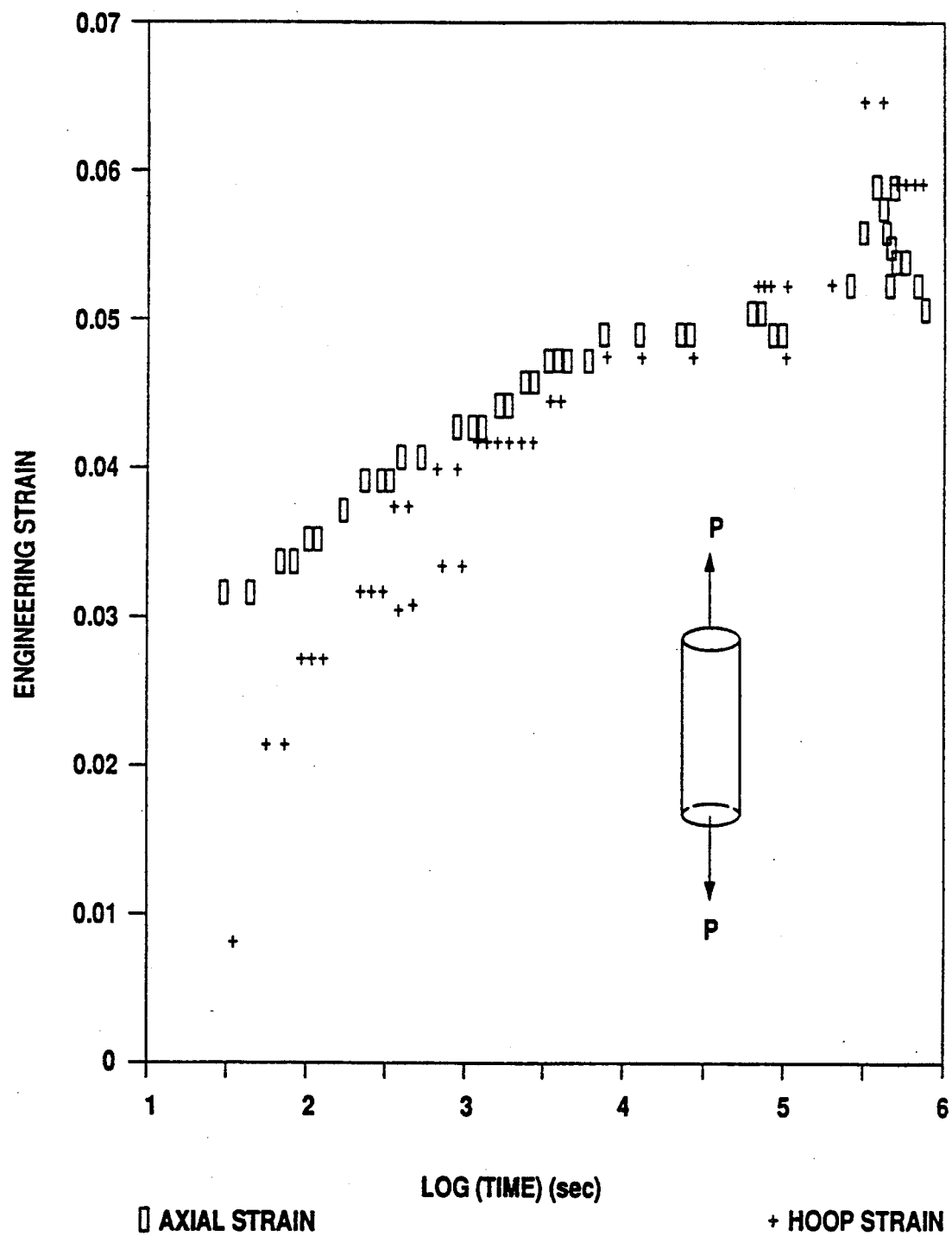

FIGS. 3-5 illustrate an analysis used to determine the creep properties of the gore material used for the preferred embodiment. As explained below, these charts illustrate that for a given material and applied pressure, creep can be analyzed at various temperatures to determine where it is stable. Stated another way, the creep of the gore material at anticipated stresses and temperatures can be analyzed to determine if the gore material is suitable and for how long it can be expected to remain suitable.

FIG. 3 is a strain-time chart of a sample of gore material to which 5035 pounds per square inch (psi) are applied in a uniform direction at room temperature. The applied stress is in the "machine direction" of the gore material, which is rolled off in strips during manufacture. This machine direction is the same as the meridional direction of balloon 10 because of the manner in which gores 12 are cut from stripped-off portions of a roll of gore material.

It is seen from FIG. 3 that at first, there is an essentially instantaneous deformation. Then, the strain continues to increase with time, but at a decreasing rate until the strain becomes nearly constant. This stage is often referred to in the art of materials engineering as "second stage creep". At that stress and temperature, the creep is considered to be stable. After the second stage creep, a point is reached, after which the creep rate increases again during what is referred to as third stage creep.

FIG. 4 is a strain-time chart, which charts the same parameters as FIG. 3, except that time is on a logarithmic scale. Also, time is charted in seconds, across a greater range than in FIG. 3. For example, one day is in the order of $10^3$ seconds, and one year is in the order of $10^7$ seconds. The linear portion of the strain to time relationship illustrates stable creep over a duration of time at the given stress and temperature.

FIG. 5 is a third strain-time chart, which charts both axial and hoop stress. For purposes of the analysis of FIG. 6, the gore material is formed into a cylinder, the ends are sealed, and the cylinder is pressurized. The axial strain is the result of stress along the axis of the cylinder as a result of the pressurization, together with stress resulting from an additional applied load so that the behavior of the cylinder will approximate that of a pressurized sphere. The hoop strain is the result of stress around the circumference of the cylinder as a result of the pressure.

FIGS. 3–5 illustrate the gore material analysis used to construct balloon 10. For different balloon volumes and pressures, materials, and temperatures, the strain and therefore the range of creep stability will vary. However, the significance of the analysis is that potential gore materials can be successfully analyzed and tested. For a given gore material, a range of permissible strain levels at various temperature is determined. From these strain levels, corresponding stress levels can be determined. These are the stress levels for which balloon 10 is then designed.

Figure 6:
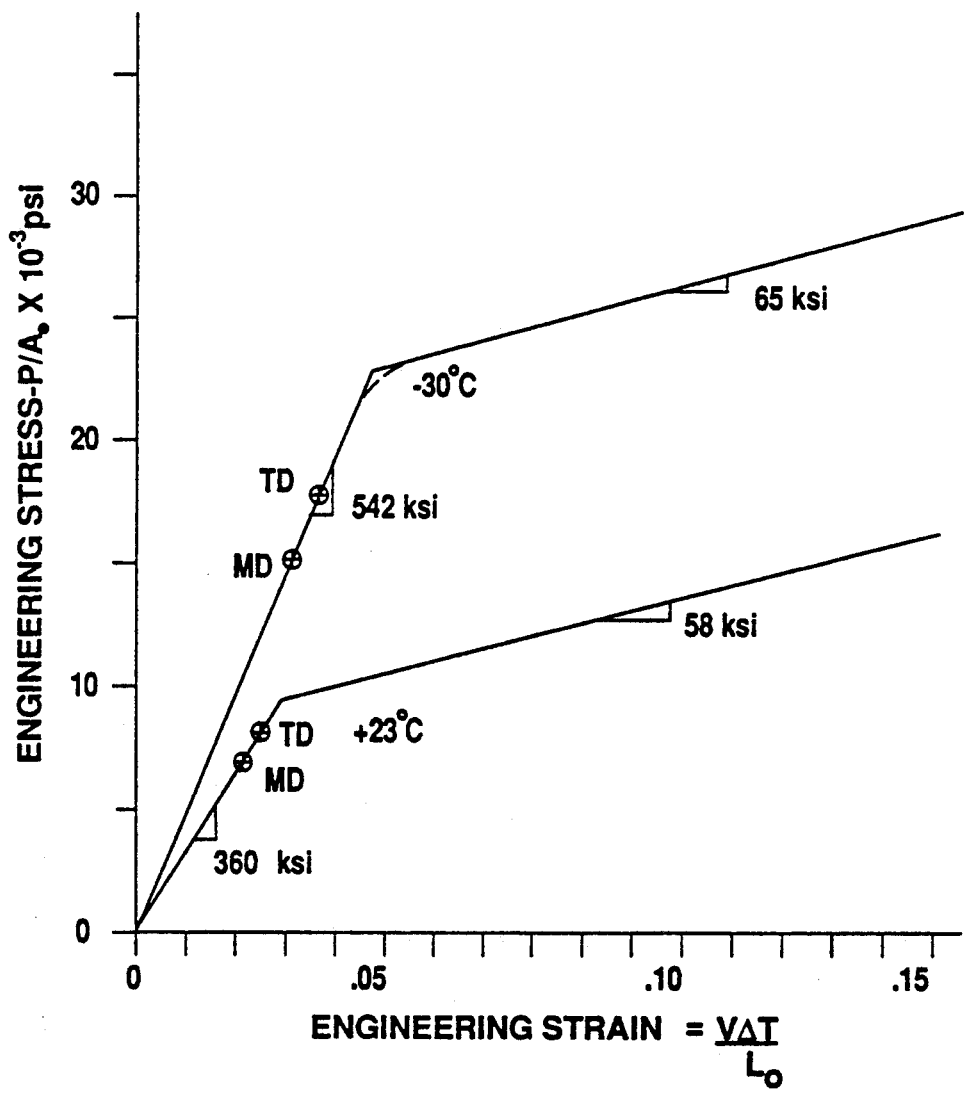
FIG. 6 illustrates a stress-strain analysis used in determining gore size.

FIG. 6 illustrates the steps of an analysis of the preferred gore material, for determining acceptable stress levels. The input data are the strain levels derived from the analysis of FIGS. 3–5. For example, if it is determined that a 5035 psi stress will result in a stable strain rate of 0.07, such as indicated in FIGS. 3–5, then those parameters can be used to determine if the resulting stress is below the yield stress. To perform the test, a varying load is applied to a test sample of gore material, having a known length (L) in both the machine direction (MD) and transverse direction (TD) at a fixed strain rate. The material is stretched at a constant velocity (V). For example, in FIG. 6, V=2 inches per minute and L=4 inches. The yield stress is determined by finding the break in linearity, i.e., the yield stress point, in the stress-strain relationship. As indicated, at a maximum expected supertemperature of 23 degrees centigrade and a minimum expected supertemperature of −30 degrees centigrade, the expected stress is below the yield stress.

The results of the creep analysis of FIGS. 3–5 and the stress-strain analysis of FIG. 6 can be used to compile the properties of a potential gore material to determine if it is suitable. Referring to FIG. 6, the modulus, i.e., stress divided by strain is 360 ksi and 542 ksi for the two different temperatures, where ksi is kilopounds per square inch. The machine direction proportional limits are 7000 and 15,000 for the two temperatures, and the transverse direction proportional limits are 7,500 and 17,500. In practice, due to the difficulty of determining the departure from linearity in the analysis of FIG. 6, an offset line, parallel to the first linear portion of the data but offset by a strain value of 0.01, is drawn such that it intersects the second linear portion of the data. The point where this line intersects the data is referred to as the "offset yield stress", and the corresponding value is used rather than the proportional limit to determine stress limits.

Using the above-described analysis, an appropriate size and shape of balloon 10, and hence of its gores 12, can now be determined. The stress must be sufficiently low to prevent creep and stay below the offset yield stress. It must be sufficiently high to maintain a positive pressure at night during low temperatures.

FIGS. 3–6 illustrate only one example of an analysis for a given material of a given thickness for a given altitude and payload. If any of these parameters are varied, the same type of analysis can be used to predict the suitability of a balloon 10 for its intended use and to design its optimum size.

Figure 7:
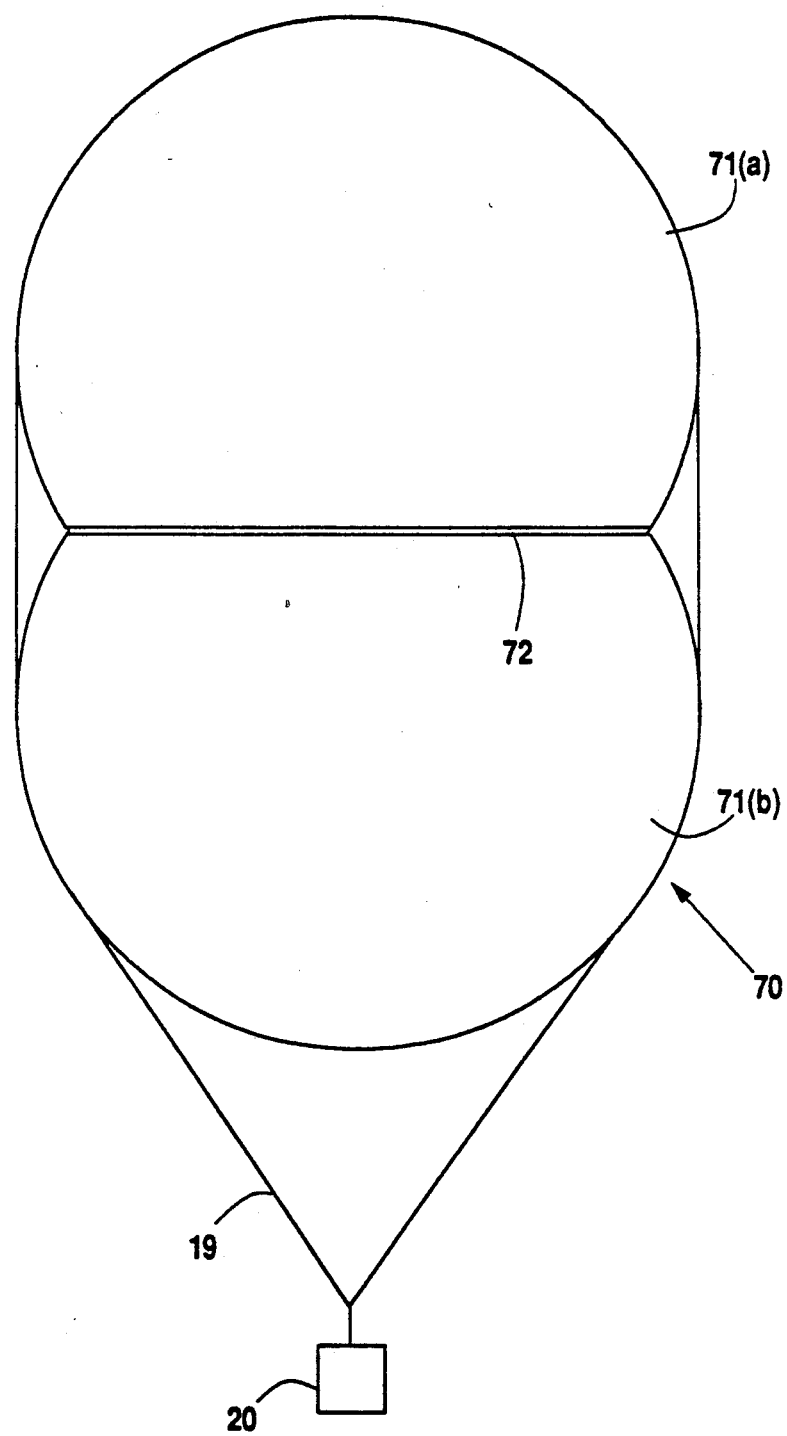
FIG. 7 is a perspective view of an alternative embodiment of the invention.

FIG. 7 is a perspective view of an alternative embodiment of the invention, a high altitude, high pressure balloon 70 having a vertical column of two intersecting spheres 71(a) and 70(1). The number of spheres is not limited to two; the advantages of the multi-sphere balloon 70 can be obtained with any number of intersecting spheres.

Figure 8A:
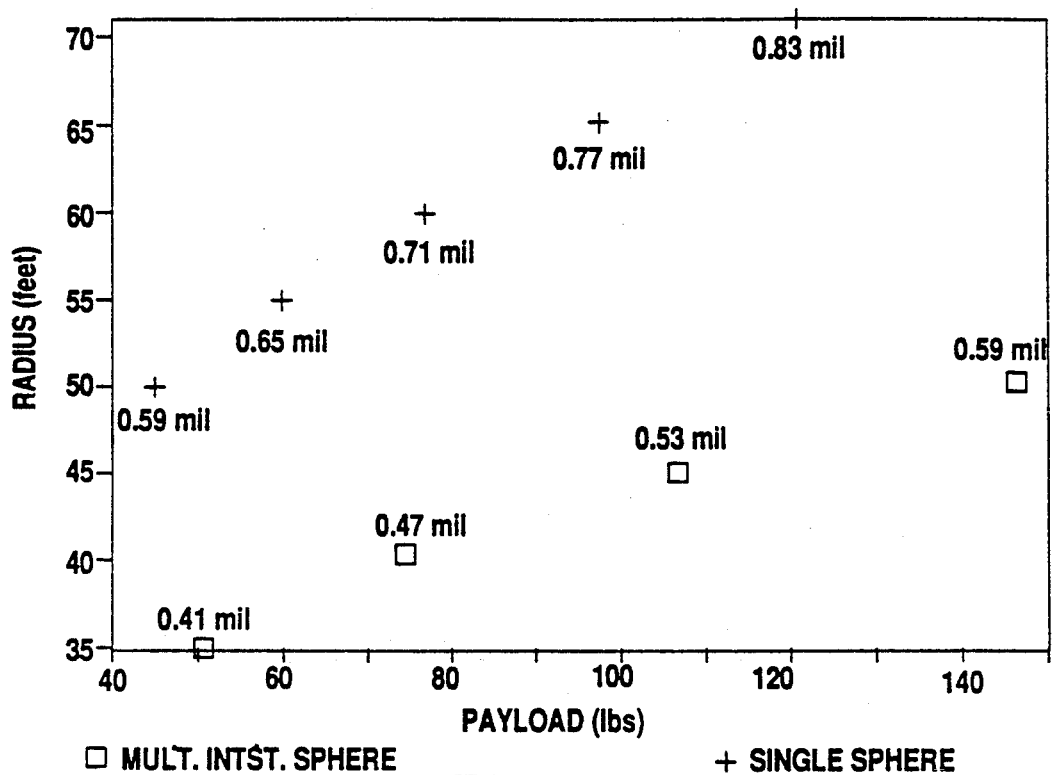
FIGS. 8A and 8B illustrate the results of weight and size comparisons of the embodiments of FIG. 1 and FIG. 7.
Figure 8B:
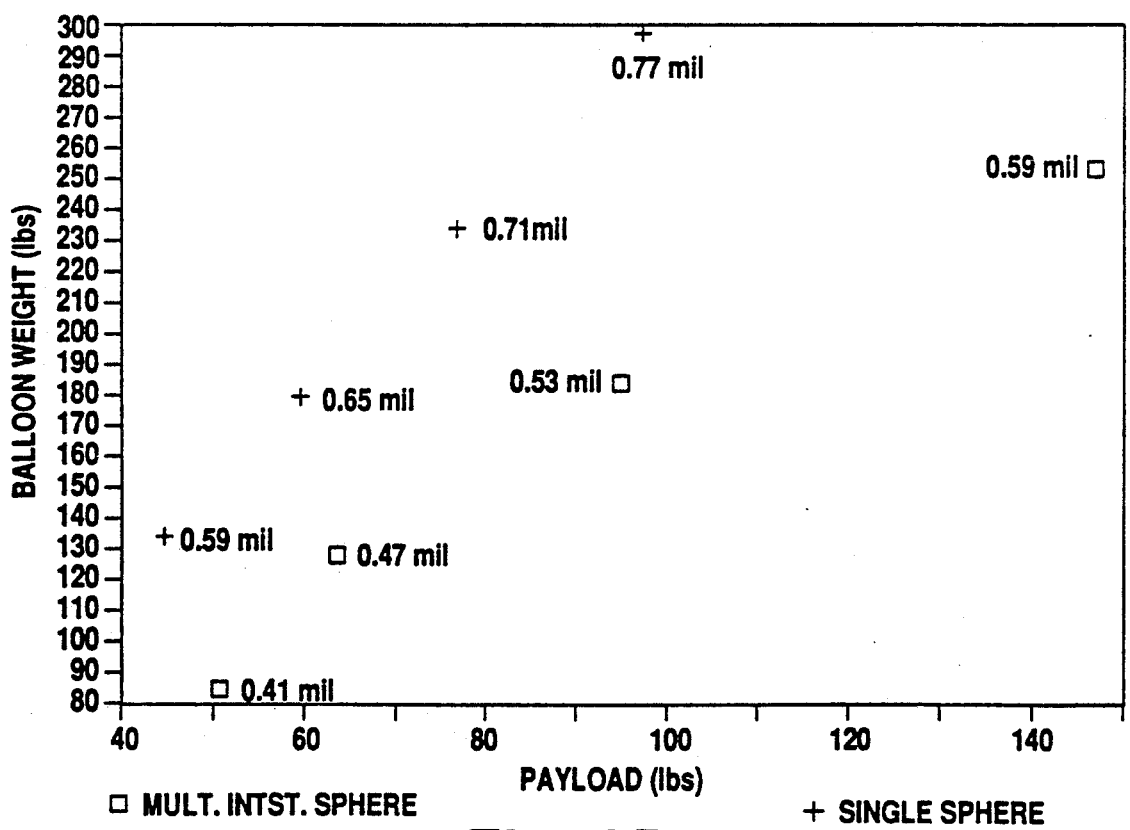

FIGS. 8A and 8B illustrate the advantages of the multi-sphere balloon 70 over the single sphere balloon 10. As stated above, the result of using a balloon 10 having this shape is that the same overall volume may be accomplished with less weight. Although the multi-sphere balloon 70 has a poorer volume to surface area ratio when compared to a single sphere, because the radius of curvature is reduced, thinner gore material can be used.

The distances between the centers of spheres may be anywhere between zero and twice the radius for spheres of equal radius. For spheres of unequal radius, r1 and r2, where r1<r2, the distances between the intersecting centers may range between r1−r2 and r2+r1. Ideally, the distance between the centers is determined so as to maximize the volume to weight ratio.

An important factor in the design of balloon 70 is controlling the stress at the intersection of the spheres 71(a) and 71(b). This intersection area tends to develop high circumferential loads, and thus a belt 72 is placed at that region that carry those loads.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A single cell, high altitude, high pressure balloon, comprising:
   a number of gores, each gore having an elongated shape that is generally narrower at both ends than in the midsection, said gores being made from a nylon gore material;
   wherein said gores are sealed together at adjacent edges to form a closed generally spherical shape when filled with gas to a high pressure, and
   wherein said material has a predetermined thickness and said gores have a predetermined size and shape, such that when said balloon is assembled and loaded with a predetermined amount of gas and placed at a predetermined altitude, the stresses within said balloon remain within a known range of stress values, such that the minimum stress value is sufficient to maintain altitude at night and the maximum stress value does not exceed a maximum allowable stress that would cause deterioration of said balloon.

2. The balloon of claim 1, wherein said gores are sealed by means of an adhesive faced sealing strip.

3. The balloon of claim 1, wherein said gores have a predetermined size, such that said balloon maintains a constant volume when filled with said gas and subjected to varying stratospheric temperatures.

4. The balloon of claim 1, wherein said gore material is a biaxially oriented nylon.

5. The balloon of claim 1, wherein said maximum allowable stress is determined by analyzing the strain characteristics of said material over time.

6. The balloon of claim 1, wherein said minimum stress value is sufficiently high to maintain a positive pressure at night.

7. A multiple sphere, high altitude, high pressure balloon, comprising:
   at least two intersecting spheres, wherein each sphere is constructed from a number of gores, each gore having an elongated shape that is generally narrower at both ends than in the midsection, said gores being made from a nylon gore material,
   wherein said gores are sealed together in an edge to edge manner to form a generally spherical shape when filled with gas to a high pressure; and
   wherein said material has a predetermined thickness and said gores have a predetermined size and shape, such that when said balloon is assembled and loaded with a predetermined amount of gas and placed at a predetermined altitude, the stresses within said balloon remain within a known range of stress values, such that the minimum stress value is sufficient to maintain altitude at night and the maximum stress value does not exceed a maximum allowable stress that would cause deterioration of said balloon; and
   a belt for constraining said spheres at their intersection.

8. The balloon of claim 7, wherein said gores are sealed by means of an adhesive faced sealing strip.

9. The balloon of claim 7, wherein said gores have a predetermined size, such that said balloon maintains a constant volume when filled with said gas and subjected to varying stratospheric temperatures.

10. The balloon of claim 7, wherein said gore material is a biaxially oriented nylon.

11. The balloon of claim 7, wherein said maximum allowable stress is determined by analyzing the strain characteristics of said material over time.

12. The balloon of claim 7, wherein said minimum stress value is sufficiently high to maintain a positive pressure at night.

13. A method of constructing a balloon for operation at a predetermined high altitude when filled with a predetermined amount of gas, and assembled from a number of gores, comprising the steps of:
   determining a maximum pressure differential of said balloon, said maximum pressure differential representing the pressure differential during high temperature at a predetermined high altitude when filled with a predetermined amount of gas;
   determining a maximum stress value to which said balloon may be subjected during said high temperature;
   determining a maximum pressure differential of said balloon, said minimum pressure differential representing the pressure differential during low temperature at low altitude when filled with said amount of gas;
   determining a minimum stress value to which said balloon must be subjected during said low temperature;
   selecting a thickness, size, and shape for gores of said balloon, such that the area and weight of the gore material permit the stress on said balloon during operation to remain below said maximum stress value and above said minimum stress value;
   placing a bottom sheet and a top sheet of said gore material upon an elongated flat surface having an edge for cutting and sealing;
   cutting said sheets of gore material to a predetermined gore length;
   cutting and sealing together a second edge of said bottom sheet to a first edge of said top sheet, along said cutting and sealing edge, thereby forming a seam along a straight line;
   repeating the above steps until a desired number of gores have been cut and sealed; and
   sealing the first edge of said first sheet to the second edge of the final sheet to form a closing seam.

14. The method of claim 13, wherein said step of determining a maximum stress value comprises analyzing the strain of said material over time to determine when creep of said material is stable.

15. The method of claim 13, wherein said steps of determining said maximum pressure differential and said minimum pressure differential include determining the thermal and optical properties of said gore material.

16. The method of claim 13, and further comprising the step of moving and aligning said seam to a curved index line on said flat surface, said index line being curved to a predetermined curvature, depending on the curvature of said gores, while applying tension along said seam such that the force applied has both longitudinal and latitudinal components.

17. The method of claim 16, wherein said step of placing said bottom sheet on an elongated surface comprises first folding said sheet longitudinally such that the open edges of said sheet are toward said edge for cutting and sealing and the folded edge is aligned along said index line.

18. A high altitude balloon, prepared by a process comprising the steps of:
   determining a maximum pressure differential of said balloon, said maximum pressure differential representing the pressure differential during high temperature at a predetermined high altitude when filled with a predetermined amount of gas;

determining a maximum stress value to which said balloon may be subjected during said high temperature;

determining a minimum pressure differential of said balloon, said minimum pressure differential representing the pressure differential during low temperature at low altitude when filled with said amount of gas;

determining a minimum stress value to which said balloon must be subjected during said low temperature;

selecting a thickness, size, and shape for gores of said balloon, such that the area and weight of the gore material permit the stress on said balloon during operation to remain below said maximum stress value and above said minimum stress value; and assembling said balloon by sealing adjacent sides of a number of said gores to form a generally spherical shaped balloon.

19. The balloon of claim 18, wherein said step of determining a maximum stress value comprises analyzing the strain of said material over time to determine when creep of said material is stable.

* * * * *